(No Model.) 2 Sheets—Sheet 1.
D. P. HEAP.
SOUND LOCATING INSTRUMENT.
No. 564,926. Patented July 28, 1896.
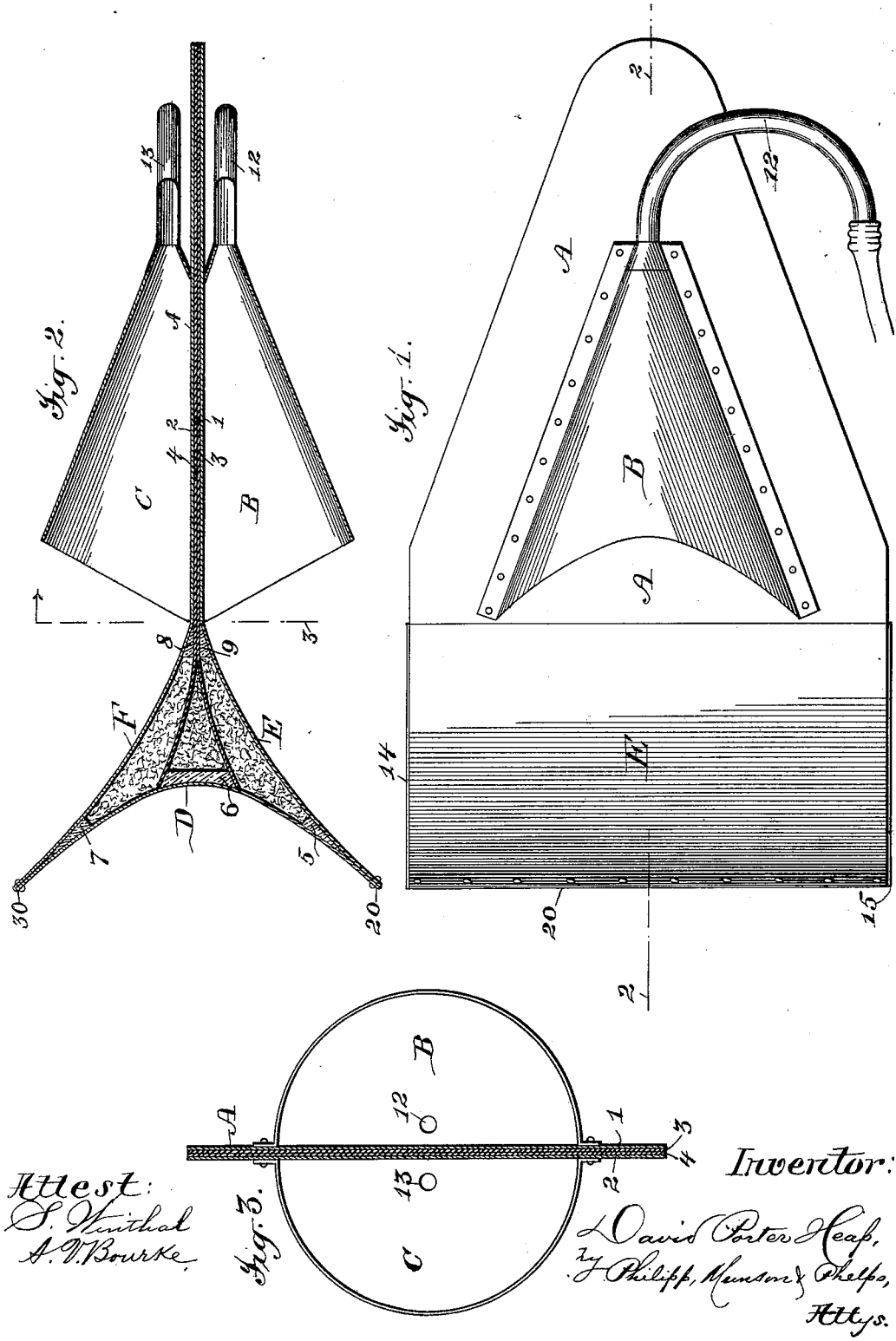

(No Model.) 2 Sheets—Sheet 2.
D. P. HEAP.
SOUND LOCATING INSTRUMENT.
No. 564,926. Patented July 28, 1896.
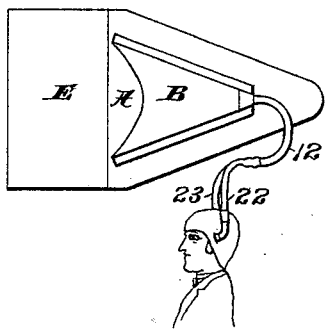
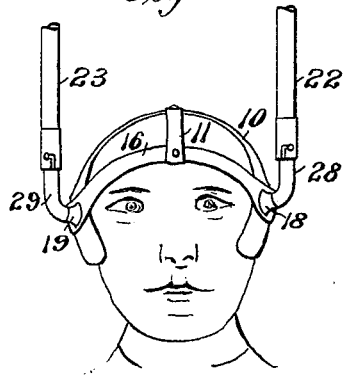
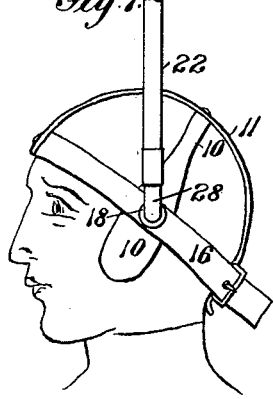
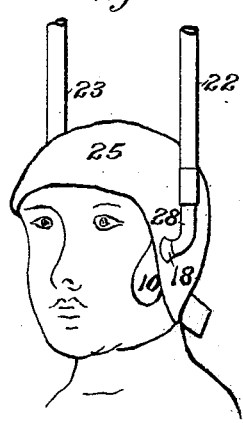
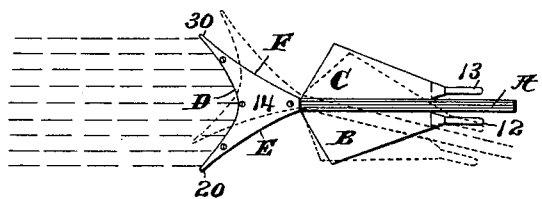
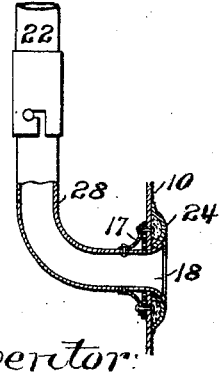
Attest:
S. Winthal
N. V. Bourke
Inventor:
David Porter Heap
by Philipp Inman & Phelps,
Attys

UNITED STATES PATENT OFFICE.

DAVID PORTER HEAP, OF THE UNITED STATES ARMY.

SOUND-LOCATING INSTRUMENT.

SPECIFICATION forming part of Letters Patent No. 564,926, dated July 28, 1896.

Application filed April 9, 1896. Serial No. 586,783. (No model.)

*To all whom it may concern:*

Be it known that I, DAVID PORTER HEAP, a citizen of the United States, and an officer in the Corps of Engineers, Army of the United States, temporarily residing at the city of Wilmington, county of New Hanover, and State of North Carolina, have invented certain new and useful Improvements in Sound-Locating Instruments, fully described and represented in the following specification and the accompanying drawings, forming a part of the same.

This invention relates to improvements in sound-locating instruments.

The purpose of this instrument is the locating of the direction of sounds produced at a point more or less distant from the instrument, its usefulness being especially realized by its employment as an aid to navigation, its operation in such use being to detect and locate the direction and position of a sound producing or reflecting object in its relation to a vessel carrying the instrument at such times when said object may not be visually perceived, as at night, during foggy weather, or by reason of distance, thereby enabling vessels navigating the high seas to change their direction of movement with relation to and hence avoid contact or collision with dangerous objects, such as vessels, icebergs, the shore, or any similar obstacle to their safe movement.

The present invention consists in novel structures in the instrument, fully hereinafter explained and claimed, having for their object not only increasing the sensitiveness of the instrument whereby the range of its sound-detecting capacity is enlarged, but improving its mode of operation whereby exactitude in determining the direction of the sound is attained, so that a sound emanating from an object, such as would be made by a horn, bell, or whistle located thereon, or one reflected from any object, as by echo, may have its location or direction indicated acoustically at a time when the object is sufficiently distant from a moving vessel to enable the course of the latter to be changed and thus avoid collision with said object and the dangers consequent thereto.

Practical embodiments of these improvements are illustrated in the accompanying drawings, in which—

Figure 1 is a side elevation of the instrument. Fig. 2 is a longitudinal sectional plan view thereof, taken on the line 2 of Fig. 1. Fig. 3 is a front end elevation of the instrument with its front guard removed on the section-line 3 of Fig. 2. Fig. 4 is a plan view of the instrument shown upon a reduced scale. Fig. 5 is a side elevation, upon a reduced scale, showing the mode of using the instrument. Figs. 6, 7, and 8 illustrate the construction of a non-sound-conducting helmet and means for connecting the instrument thereto, and Fig. 9 is a detail view of one of the earpieces.

In its general construction the instrument shown as embodying the present improvements consists of two sound-receivers located on opposite sides of a vertical partition and arranged to point in slightly diverging though general forward directions toward the objective sound, which receivers are each provided with a conductor for conveying sound to the ears of the operator, communication between the said conductors and the ears being had through flexible tubes which terminate in earpieces, and means are provided for so supporting the instrument that it may be vibrated horizontally in searching for or locating the direction of any sound.

As heretofore constructed the tubulous sound-receivers of an eophone have been located near the rear end and in substantial parallelism on opposite sides of a vertical separating-partition extending horizontally between them and having its opposite sides concaved vertically. The mouths or entrances of these receivers not only terminate near the rear end of their separating-partition, but they are flattened so as to constitute them narrow slot-like sound-passages shaped vertically to conform with and so as to lie in close proximity to the sound-deflecting surfaces, as by being concaved to follow the vertical curvature of the concaved side or sound-deflecting surfaces or of opposite sides of their supporting-partition. In contradistinction to such a structure this improved instrument has its sound-receivers extended forward over the greater part of the longitudinal extent of the separating-partition and may be practically coequal therewith, and their mouths are opened laterally from said partition, and so enlarged or widened outward from the sides of the vertical partition as to provide them with enlarged mouths. Said receivers are shown as tapered in form longitudinally and semiconical transversely, and this is preferred, but they may be circular, conical, or polygonal in cross-section, in which cases the partition A will have a suitably corresponding sectional structure. The receiving ends of these sound-receiving conductors are preferably cut rearwardly at such an angle to the sides of the central partition as to cause their mouths to face outward from said partition. By thus providing the receivers with enlarged and broad or wide open mouths an extensive entrance therefor is made which will receive and conduct to the ears of the operator such an area, extent, or quantity of sound-waves as will render a distant sound not only quickly perceptible to the hearing of the operator, but admit a volume great enough to produce not only a distinct impression, but one of sufficient intensity to be practically effective in attaining the object sought. Such a structure, when used for the reception of sound-waves with or without the aid of deflecting-surfaces, as distinguished from the narrow slot-like receiving-passages, enlarges not only the field of observation, but increases the range or distance at which sounds may be made audible to the observer. Thus with the enlarged or wide open-mouthed receivers terminating at the section-line 3, as shown in Fig. 3, rearward thereof or even with the central partition extended straight outward a distance beyond them, the improved results heretofore set forth are accomplished. I prefer, however, to provide the instrument with a guard D, so sustained in front of the mouths of its sound-receivers as to obstruct the same and reflect the sound-waves, thus preventing at times, as far as may be, the passage of sound-waves into them, and more particularly when the instrument is pointing directly toward the source of sound, said guard, however, being constructed and located so as to provide sufficient space between its extremities and the mouths of the receivers as to permit the passage of sound-waves to the latter when this space is more or less unobstructed when it partially or wholly confronts the sound. Although this guard D might be sustained as hereinafter appears, I prefer to extend the central partition A in advance of the mouths of the receivers and spread or bend it outwardly in opposite directions, as shown, so as to widen its forward end and convert it into the guard D, the front face of which is of such a widthwise extent as to substantially cover or shield the mouths of the receivers B C and reflect the sound-waves therefrom, the sides of said spread or widened front end of the partition or guard constituting deflectors E F, preferably curved horizontally, for guiding or deflecting the waves of sound impinging upon them directly into the conveying-receivers, whereby the sound-waves are carried to the ears of the operator through the sound-conductors 12 13, the sides of which deflectors may of course be made to conform vertically with whatever shape is given to the partition when it is extended, as just described, as a supporting-carrier for the guard D.

When the instrument is pointed directly at the source of sound, the guard D will partially intercept the sound-waves and shield or cover the mouths of the sound-receivers, as shown in full lines in Fig. 4, thus so obstructing the direct passage of the sound-waves to the receivers that practically most of such sound-waves as pass the extremities or edges 20 30 of said guard will move or travel past and beyond the receivers B C, which sound-waves thus escaping said receivers will practically be inaudible to the operator, but when the operator moves the instrument slightly in a lateral direction, as indicated by the dotted lines in Fig. 4, the sound-waves passing the guard D at one extremity or edge thereof, as 20, will pass directly into the receiver, as B, at that side and thus become audible in the left ear of the operator, while no sound will be appreciable in his right ear. In this operation it will be observed that when the instrument has its longitudinal axis alined with the sound-producing point, the guard D will so obstruct the sound-waves that but little, if any sound, can be heard in either receiver while but a slight movement of the instrument in either direction will admit the flow of sound-waves past one or the other extremity or edge of the guard D, into one receiver or the other, and provide for the entrance of a large volume of sound into one ear or the other, thus making the transitions from silence to sound very marked and enabling the direction of the sound to be located with great accuracy, and by moving the instrument laterally but a few degrees.

The front face of the guard D, though shown as being curved, might be straight, as either shape would be effective as a reflector for the sound-waves impinging thereon when presented directly toward the source of sound, and thus so obstructing the sound-waves meeting it as to prevent them from entering either of the receivers B C, but the curved form is of great utility, because when its relation to the source of sound is such that the direction of the movement of the sound-waves carries some waves which pass one of its edges, as say 20, into one of the receivers, as B, then such sound-waves as impinge upon the guard D and are obstructed and reflected thereby will not only be thus prevented from entering the non-active receiver, as C, but will additionally be deflected in a direction diametrically away from the same.

The deflectors E F, connecting the front guard D with the sides of the central partition A, although preferably curved might be straight, or be shaped so as to constitute only a supporting strut or brace sustaining the front guard D in its position relative to the partition A, but for simplicity of construction and perfection of operation the curved form shown is preferred, and especially for the reason that sound-waves coming laterally into contact with either of these deflectors will, by reason of the guiding action of the curved form, be deflected directly into its companion receiver.

In constructing this improved instrument, materials are preferably used which are good non-conductors of sound. Thus, the partition A is made a non-conductor of sound whereby insulation of one receiver from the other is attained. This may be accomplished in a preferred form by a structure composed of four laminæ of fibrous material, preferably wood fiber, which is capable of being made into sheet form. The outer sheets 1 and 2 may be a thin veneer or veneers of wood or of wood fiber united to form a heavy board and thus afford strength sufficient to enable them to be secured in place, or be spread apart to form the deflectors E F and support the guard D, whose curved face is constructed of like material. The inner laminæ 3 4 are preferably of a softer fiber than wood veneers or compacted fiber, as, for instance, sheets of half-stuff or paper-stock or "water-leaf," suitably dried and preferably composed of sulfite wood fiber, such sheets offering resistance enough to support the sheets 1 and 2 apart. The partition A is thus composed in its outer sheets of a good non-sound conductor, and in its inner sheets or interior of a superior non-sound conductor, said interior, when in the form of sheets 3 4, having the same preferably extended forward to constitute interior divisions of the guard D, extended beyond the partition and supported before the receivers B C. Where the divisions of the said guard come together, it is preferable to support and strengthen them by means of blocks of wood 5 6 7 8 9, and in order that the said guard may be a superior non-conductor of sound in all directions, that is, from its face rearward when the instrument is pointed directly toward the source of sound or from one side laterally to the other when the instrument is swung so as to allow the waves of sound to pass beyond the head of the guard at one side thereof and be directed into one of the receivers, said head or guard is packed interiorly with a good non-conducting substance, preferably one which has the additional feature of lightness, as cork or cotton, though wood fiber, as excelsior or dried sulfite pulp would serve the purpose. In order to confine this packing and maintain it in place, the top and bottom of the guard are closed by sheets, as 14 15, of the light material, as before stated. Such insulation or protection from conduction of sound in undesirable directions may be attained by an air-cushion in place of the non-conductor or packing, but when the air-cushion is used I prefer to form the outer walls of both the partition A and the deflectors D E of a non-sound-conducting material.

While the several parts of this instrument as thus far described are shown as riveted together, other means of fastening them may be adopted. The guard D, although herein shown as covering the mouths of the receivers B C, and preferably extending laterally beyond the same, need not extend beyond them, but preferably the structure will be that shown, as with it a high degree of efficiency has been attained practically.

Although the receivers are shown to be semicircular formations transversely, it is obvious that if each receiver had an elliptical or polygonal or even circular formation transversely, so that the top and bottom of the side next to the partition A stood slightly away from the partition, some, if not all, of the advantageous results would be attained if the instrument were otherwise constructed, as herein described or shown.

While the sides of the vertical partition A are shown and have been described as straight, they may be slightly curved or made concave vertically to suit the transverse form of the receivers, as may also be the sides of the front guard, without departing from the invention.

In using this instrument it may be supported for use in any suitable manner. Thus, it might be mounted upon a stand as is a surveyor's instrument and be appropriately moved by hand, and this is the preferable way. Its sound-conductors 12 13 may, of course, lead directly to the ears of the operator, or be provided with flexible extensions, as the tubes 22 23, connected with earpieces 18 19; but in its special use, as upon vessels, whether or not the operator be housed, it is important to protect the ears from extraneous sounds by covering the head of the operator with a non-conducting helmet, so that sounds may not be heard through impact with the body.

A good form of helmet and earpiece carrier is illustrated in Figs. 6 to 9, and consists of a carrier 10, made of a flat flexible strip of non-conducting material, shaped to cover both ears, and of a length to extend from one ear to the other over the top of the head. The earpieces 18 19 are secured to this carrier and have projecting upturned short tubes 28 29, adapted to be readily coupled to the rubber hose 22 23, constituting the flexible connection with the conductors 12 13. As a support for this earpiece-carrier, a band 11 of like flat flexible non-conducting material is secured to the carrier 10, as by a rivet, and extended at right angles thereto, so as to pass from the forehead over the top of the head to the nape of the neck, said carrier 10 and band 11 being again secured together by a band 16, attached to the forward end of the band 11 and connected with the carrier 10 near its forward ends and with the rear end of the band 11, and preferably being made in whole or in part of elastic material, so as to provide a means of securing the helmet in place, as by a buckle.

The earpieces consist of a tube 28 (see Fig. 9) bent so as to project upward to connect with the instrument above the head of the operator, the delivery end of which tube passes through a hole in the carrier 10, beyond which its flaring end projects sufficiently to receive upon it an annular rubber cushion 24, the tube being connected rigidly to the carrier 10 by means of a collar 17, riveted in place, the whole earpiece 18 being substantially like the phone of a telephonic instrument, though the cushion 24 may be of hard or soft rubber, as may be desired, or may be entirely omitted.

The tubes 28 29 may pass through the band 16, if desired, and the whole will be enveloped by a covering or hood 25, made of a non-sound conductor, as felt, leather, or knitted goods, the same being attached to the framework in any suitable manner, or the helmet may be made of non-sound conducting material, as wood fiber, &c., capable of being molded or otherwise fashioned into suitable shape and having strength sufficient to support the earpieces and thus dispensing with some or all of the bands.

The essential characteristics of this helmet are that it shall so far envelop the head of the operator as to constitute an insulating device rendering sounds inaudible by impact and provided with earpieces 18.

From the foregoing description of the construction and operation of this sound-locating instrument, it will have been observed that its method of use is to so move a guard that extends transversely over the mouths of substantially parallel or forwardly-pointing sound-receivers in such relation to them and to the direction of the sound as to wholly obscure said receivers and thus cut off the sound-waves from entrance into either of them, or to uncover or partially uncover one or the other receiver and thus permit the entrance of sound-waves therein, whence it results that the sound is heard through only one receiver at a time and thus the location thereof with respect to the direction in which the instrument points is made apparent. This guard has been described as of a width substantially equal to the dimensions of the mouths of the receivers. It may be slightly less or greater in extent than said receivers, and yet produce good results. It is therefore to be understood that any arrangement of a front guard with respect to the substantially parallel or forwardly-pointing sound-receivers whereby when the instrument is directed toward the source of sound both of them may have the sound-waves obscured therefrom, while by a movement of said front guard, such as a sliding or swinging action with respect to such receivers, the sound-waves may be admitted alternately into both, is to be regarded as within the scope of this invention.

The partition, earpieces, deflector, and other parts may be covered with thin sheets of brass or other metal to protect them from the weather and to add to the appearance of the instrument.

What is claimed is—

1. A sound-locating instrument consisting of two acoustic receivers and a sound-obstructing guard in front of and covering their mouths, substantially as described.

2. A sound-locating instrument consisting of a vertical separating-partition, a guard and of two acoustic receivers with enlarged mouths one on each side of the partition, substantially as described.

3. A sound-locating instrument consisting of a vertical separating-partition, a guard and two acoustic receivers with enlarged mouths one on each side of the partition and each provided with a sound-conductor, substantially as described.

4. A sound-locating instrument consisting of a vertical separating-partition, two acoustic receivers with enlarged mouths one on each side of the partition and a front guard, substantially as described.

5. A sound-locating instrument consisting of two acoustic receivers, an interposed vertical separating-partition and a guard sustained in front of said receivers and extending laterally so as to cover the mouths thereof, subtantially as described.

6. A sound-locating instrument consisting of a vertical separating-partition, two acoustic receivers with enlarged mouths one on each side of the partition, and a front guard having a curved face, substantially as described.

7. A sound-locating instrument consisting of a vertical separating-partition, two acoustic receivers with enlarged mouths one on each side of the partition, and a front guard having curved sides, substantially as described.

8. A sound-locating instrument consisting of a vertical separating-partition, two acoustic receivers with enlarged mouths one on each side of the partition, and a front guard having curved sides and a curved face, substantially as described.

9. A sound-locating instrument consisting of two acoustic receivers one on each side of a vertical separating-partition and a guard extending laterally before the mouths of said receivers, the front walls or edges of said mouths being respectively at angles with the sides of said guard, substantially as described.

10. In a sound-locating instrument, two acoustic receivers insulated from each other by means of a non-sound-conductor, substantially as described.

11. In a sound-locating instrument, two acoustic receivers and an interposed separating-partition consisting of or provided with a non-sound-conducting material, to insulate one receiver from the other, substantially as described.

12. In a sound-locating instrument, two acoustic receivers and an interposed separating-partition consisting of or provided with a non-sound-conducting material, and a head constructed of or provided with a non-sound-conducting material, substantially as described.

13. A sound-locating instrument, consisting of two acoustic receivers with enlarged mouths, a separating-partition, a guard of approximately triangular form covering the mouths of said receivers, the front whereof operates as a shield and the sides as deflectors, substantially as described.

14. In a sound-locating instrument consisting of two independent acoustic receivers provided with a front guard and partition, the combination therewith of means for moving said guard with respect to the source of sound so as to cut off the sound-waves from said receivers or to admit sound-waves to one or the other of them, substantially as described.

15. The combination with a sound-receiving instrument and the sound-conductors thereof which lead to the ears of the operator, of a non-sound-conducting helmet, substantially as described.

16. A helmet for use upon the heads of persons operating sound-conducting instruments, the same consisting of a non-sound-conducting envelop combined with sound-conducting tubes or earpieces, substantially as described.

In testimony whereof I have hereunto set my hand in the presence of two subscribing witnesses.

DAVID PORTER HEAP.

Witnesses:
   I. C. LODER,
   EDGAR JADWIN.